United States Patent [19]

Kartman, Jr.

[11] Patent Number: 5,043,619

[45] Date of Patent: Aug. 27, 1991

[54] BRUSH HOLDER ASSEMBLY

[75] Inventor: Kenneth E. Kartman, Jr., Waukesha, Wis.

[73] Assignee: Helwig Carbon Products, Inc., Milwaukee, Wis.

[21] Appl. No.: 498,692

[22] Filed: Mar. 26, 1990

[51] Int. Cl.[5] ........................ H02K 5/14; H02K 13/00

[52] U.S. Cl. .................................... 310/242; 310/239; 310/245

[58] Field of Search ............... 310/238, 239, 242, 245, 310/246, 247, 249

[56] References Cited

U.S. PATENT DOCUMENTS

| | | | |
|---|---|---|---|
| 3,449,608 | 6/1969 | McLean | 310/246 |
| 3,466,481 | 9/1969 | Sckerl | 310/239 |
| 3,471,732 | 10/1969 | Drabik | 310/239 |
| 3,526,797 | 9/1970 | Jueschke | 310/245 |
| 3,590,298 | 6/1971 | Hudak | 310/246 |
| 3,634,710 | 1/1972 | Woda | 310/239 |
| 3,902,088 | 8/1975 | Guglielmo | 310/246 |
| 3,968,391 | 7/1976 | Blank | 310/240 |
| 4,110,650 | 8/1978 | Kemp et al. | 310/239 |
| 4,246,507 | 1/1981 | Weldon et al. | 310/242 |
| 4,296,346 | 10/1981 | Ooki et al. | 310/242 |
| 4,329,611 | 5/1982 | Ohmstedt et al. | 310/227 |
| 4,366,404 | 12/1982 | Ziegler | 310/239 |
| 4,580,333 | 4/1986 | Griffis | 310/239 |
| 4,602,181 | 7/1986 | Dietrich et al. | 310/241 |
| 4,625,136 | 11/1986 | Kipke | 310/239 |
| 4,663,552 | 5/1987 | Ohmstedt | 310/246 |

FOREIGN PATENT DOCUMENTS

| | | | |
|---|---|---|---|
| 3417523 | 11/1985 | Fed. Rep. of Germany | 310/242 |
| 0886116 | 11/1981 | U.S.S.R. | 310/239 |
| 0917245 | 3/1982 | U.S.S.R. | 310/239 |
| 1020898 | 5/1983 | U.S.S.R. | 310/239 |

*Primary Examiner*—Steven L. Stephan
*Assistant Examiner*—C. LaBalle
*Attorney, Agent, or Firm*—Nilles & Nilles

[57] ABSTRACT

A brush holder assembly for use in a dynamoelectric machine has an electrically conductive support and is releasably mounted on a part of the frame of the dynamoelectric machine. The support has a freestanding front terminus, and a plurality of individual brush holders are each mounted by a detachable connection to the front terminus in side-by-side relation to each other. The detachable connection permits individual replacement of the brush holders. The brush holders each have a front end and a quick disconnect mount on the front end. A brush which is insertable in the brush holder has a disconnect terminal connectable with the mount. A constant brush force applying mechanism is located on the front end of the holder. The detachable connection, brush holders, constant brush force applying mechanism, quick disconnect mount and disconnect terminal are all adjacent each other to be accessible at the front terminus to facilitate safe and fast service thereof.

6 Claims, 3 Drawing Sheets

BRUSH HOLDER ASSEMBLY

BACKGROUND OF THE INVENTION

1. Field of the Invention

This invention relates to a brush holder assembly for use in a dynamoelectric machine and more specifically to a brush holder assembly having an improved orientation of the assembly components to facilitate service.

2. Description of the Related Art

High speed large dynamoelectric machines utilize extremely high numbers of brush holder assemblies which frequently fully occupy all available circumferential space around a rotatable commutator or rotor of the machine. As is well known, each brush holder assembly includes a housing holding a plurality of individual carbon brushes mounted in stationary brush boxes. The carbon brushes are each biased into contact with the rotating commutator surface by a spring biasing mechanism. Each brush has a flexible shunt wire which is connected to the brush box to assure good electrical flow between the brush and a main electrical terminal that is carried by the brush holder housing.

The individual brushes are subject to constant wear and need to be periodically removed and replaced for which purpose suitable access must be provided. Providing access which allows for suitable working clearance has become very difficult because of the large number of brushes and their close relationship to each other. During brush replacement, the spring biasing mechanism must of course be removed, the shunt wire disconnected, and the brush removed. The new brush must be installed, the spring biasing mechanism reinstalled and the shunt wire reconnected.

In the prior art it is the practice to provide a single unitary housing containing a plurality of brush boxes. Brushes are subject to overheating which can damage or warp the brush box housing. If any part of the brush box housing is damaged, replacement of the entire housing is needed and this requires even more access than replacement of individual brushes. Replacing the entire unitary housing also increases the expense.

Prior art brush assemblies have not been ergonomically designed to permit service personnel to efficiently insert hands and tools in the limited space available. More specifically, the orientation of the individual components of the assembly have not facilitated either brush replacement or brush box housing replacement. Because the brush assemblies of dynamoelectric machines have not been ergonomically orientated, their installation has been cramped and access thereto for service and replacement has been awkward. This reduces safety and increases the hours required to service the machine. The hourly rate paid for such service is very high making such work extremely expensive. In addition, the dynamoelectric machine is out of production during this time which adds to the total cost of service.

The prior art discloses many arrangements for mounting brushes in a dynamoelectric machine including those described in the following patents: U.S. Pat. No. 4,246,507, Weldon et al; U.S. Pat. No. 4,329,611, Ohmstedt et al; U.S. Pat. No. 4,366,404, Ziegler; U.S. Pat. No. 4,602,181, Dietrich et al; and U.S. Pat. No. 4,663,552, Ohmstedt. All of these patents show brush holders with replaceable brushes wherein the various components are widely spaced apart in awkward locations making access difficult, time consuming, expensive and less safe. This prior art does not provide the various components in one location to concentrate the locus for service and replacement in the most compact area possible to maximize the accessibility provided by service openings in the machine. Further, this prior art does not deal with the problem of how to minimize time and cost when there is damage to the unitary brush housing requiring replacement.

SUMMARY OF THE INVENTION

The present invention provides a brush holder assembly wherein the various components are oriented to be in one location to concentrate the locus of all components requiring service in the most compact area possible to maximize the accessibility provided by service openings in the dynamoelectric machine. Further, the present invention avoids the need to replace the entire brush holder housing when only one individual brush holder requires replacement.

More specifically, the present invention provides a brush holder assembly including an electrically conductive support having a plurality of main electric terminals for connection to power lines. The support has means to releasably mount the support on a frame of a dynamoelectric machine and a freestanding front terminus having a mounting surface. A plurality of individual constant force brush holders are provided each detachably connected to the mounting surface in side-by-side relation to each other. Each brush holder has spaced apart sides, a rear end, a front end, a brush box between said front and rear ends for receiving a brush that includes a flexible wire lead extending therefrom which has a quick disconnect terminal, and a constant brush force applying means located at the front end. A quick disconnect mount is provided on each constant force brush holder so as to also be accessible from the front end thereof to permit insertion of the quick disconnect terminal of an associated brush. Preferably the quick disconnect mount and the constant brush force applying means are adjacent each other at the front end of each individual brush holder so that both will be accessible from the front end of the brush holder. Preferably the quick disconnect mount will be secured to the front end of the brush holder in laterally offset relation to the constant brush force applying means so that the latter and the mount are in adjacent closely spaced side-by-side relation to each other.

The individual brush holders may each be detachably mounted on the supporting surface by a releasable clamp means at the front terminus. The releasable clamp means is actuatable to either a clamping position applying a compressive force to secure the associated individual brush box on the freestanding front terminus end or to an unclamped position releasing the brush box from the compression force to permit removal of any one individual brush box without removing the clamp means on any adjacent brush boxes.

Preferably the clamp means includes a slide bar secured in spaced relation from the mounting surface of the terminus. The rear end of the associated individual brush box includes a channel for slidably receiving the side bar therein.

The electrically conductive support includes a base portion in which the electric main terminals are mounted, a plurality of spaced apart beams each extending outboard from the base portion. Each beam terminates in an outboard end. A cross beam connects the outboard ends and provides the mounting surface for the individual brush holders. Access apertures may be provided in the support between the spaced adjacent cantilever beams to facilitate coolant gas flow.

BRIEF DESCRIPTION OF THE PREFERRED EMBODIMENT

Figure 2:
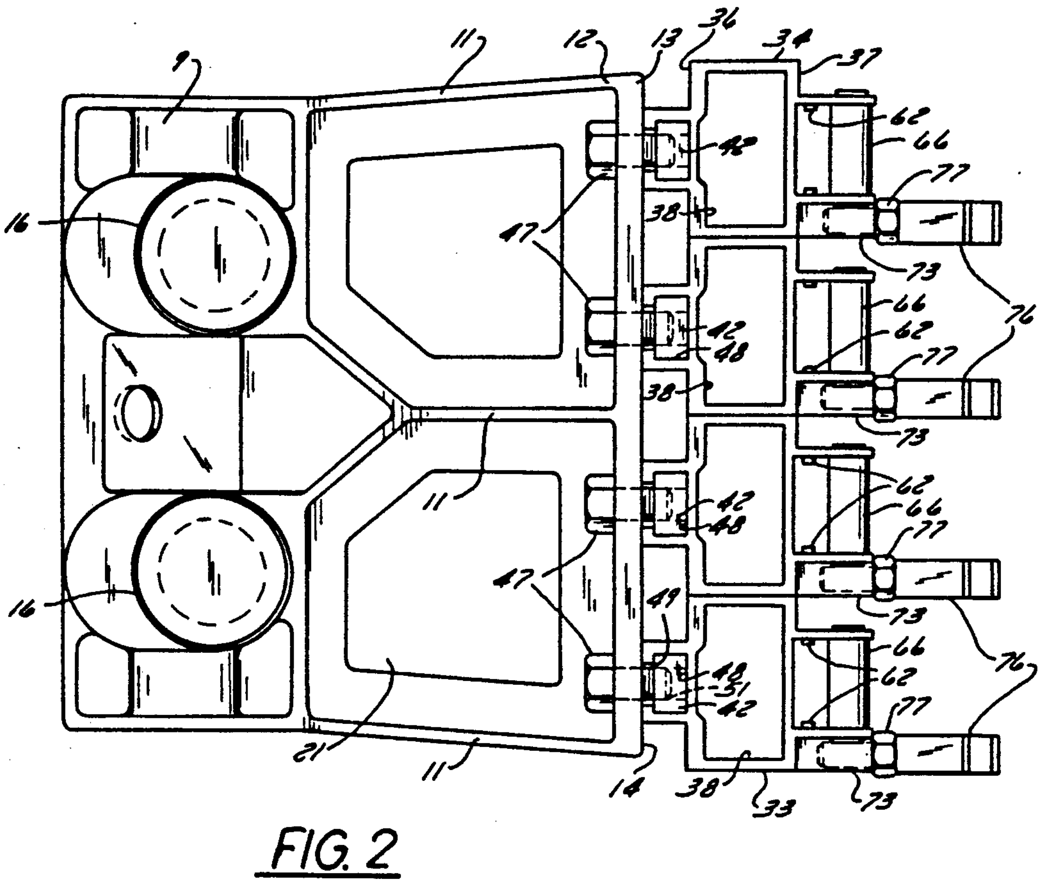
FIG. 2 is a plan view of the brush holder assembly shown in FIG. 1.
Figure 1:
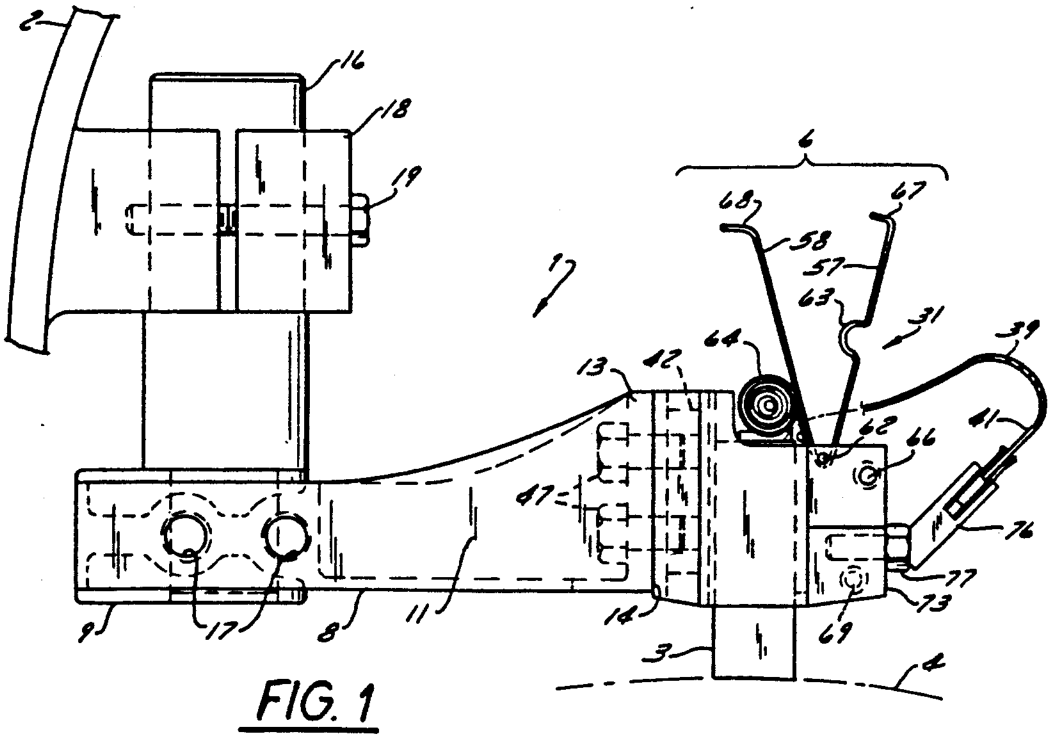
FIG. 1 is a side elevational view of a brush holder assembly constructed according to the present invention.

Referring to FIGS. 1-4, a brush holder assembly 1 is releasably mounted on the frame 2 of a dynamoelectric machine such as a motor or generator. The brush holder assembly 1 disposes a plurality of brushes 3 in engagement with a rotatable commutator 4 of the machine. The brush holder assembly has a front end locus 6 in which all of the service components of the brush holder assembly are concentrated to maximize accessibility for safe and fast service purposes.

The brush holder assembly 1 comprises an electrically conductive support in the form of a casting 8. The casting includes a base portion 9 and a plurality of spaced apart cantilevered beams 11 which extend outboard from the base portion 9. Each of the cantilevered beams terminate in an outboard end 12 constituting a freestanding front terminus at locus 6. A cross beam 13 connects the outboard ends 12. The cross beam 13 constitutes a freestanding front terminus of the support and has a mounting surface 14 to which a plurality of individual brush holders are detachably connected as will be hereinafter described. A plurality of electric main terminals 16 are threadably mounted in the base portion 9 and locked therein by means of set screws (not shown) in apertures 17. The main terminal is secured to the frame of the dynamoelectric machine by means of a saddle clamp 18 and cap screws 19. As best appears in FIG. 2, the support casting 8 has access apertures 21 therethrough between adjacent spaced apart cantilevered beams 11 to facilitate the flow of cooling gas.

A plurality of individual constant force brush holders 31 are detachably connected mechanically and electrically to the mounting surface 14 of the support cross beam 13 in side-by-side relation to each other as shown in FIG. 2 by a detachable connecting means 42. The individual constant force brush holders 31 are identical in construction and therefore only one such brush holder and its detachable connecting means will be described in detail.

Figure 3:
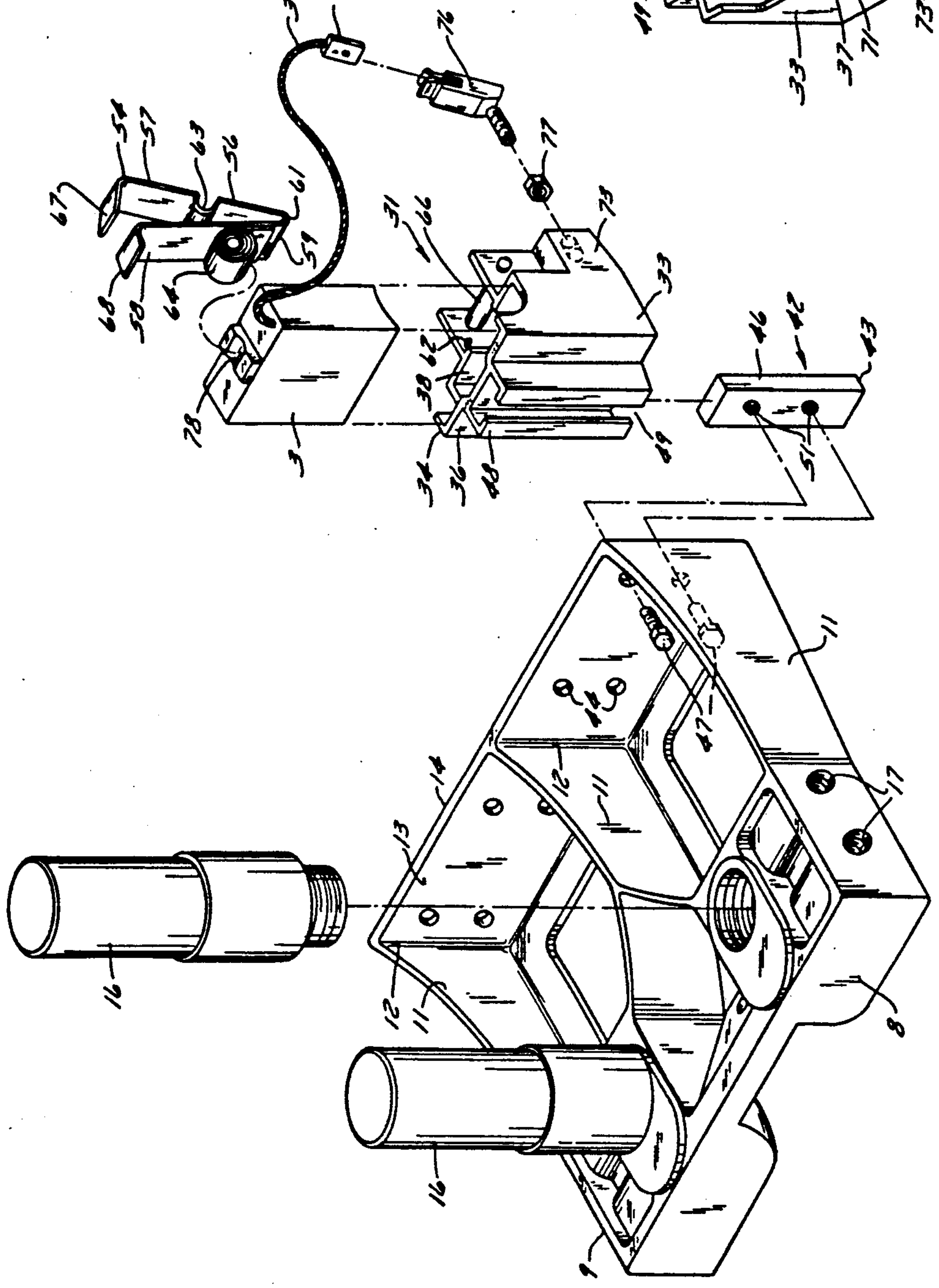
FIG. 3 is an exploded view of the brush holder assembly shown in FIGS. 1 and 2.
Figure 4:
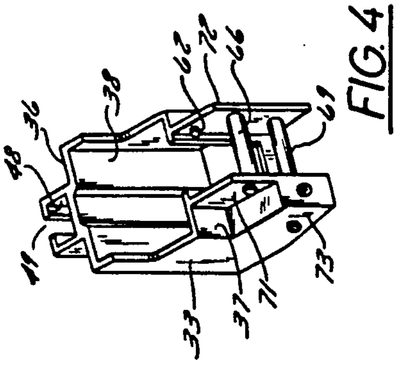
FIG. 4 is an isometric projection view of one of the individual brush boxes shown in the brush assembly of FIGS. 1-3.
Figure 5:
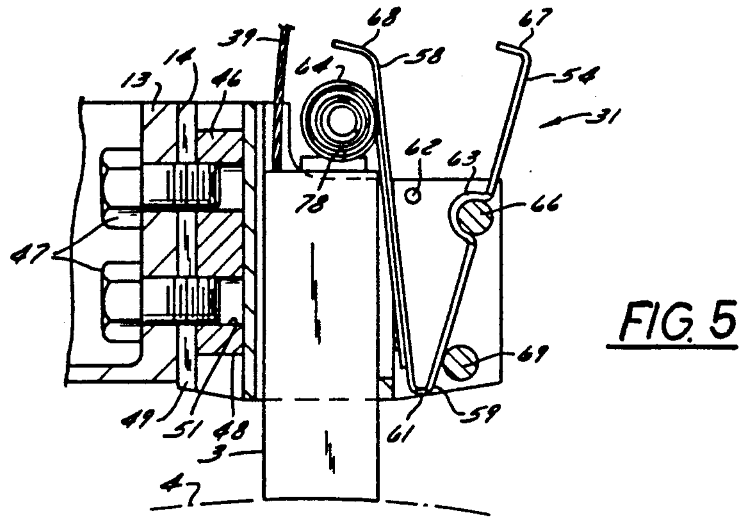
FIG. 5 is a partial view of the brush holder assembly shown in FIG. 1, in section, illustrating the brush in an initially installed position with a portion of the brush shunt wire omitted for purposes of clarity.

Referring to FIGS. 3 and 4, the brush holder 31 has spaced apart sides 33, 34, a rear end 36 and a front end 37. A brush box 38 is defined between the front and rear ends for receiving the brush 3 slidably therein. The brush 3 includes a flexible wire lead or shunt 39 extending therefrom. The wire lead has a disconnect terminal 41 at the end thereof. The detachable connecting means 42 comprises a releasable clamp mechanism 43 mounted between the support surface 14 of the cross beam and the rear end 36 of an associated individual brush box. The releasable clamp mechanism 43 includes a pair of vertically spaced apart holes 44 in the cross beam 14; a quick release clamp bar 46 having a pair of internally threaded apertures 51 alignable with the holes 44 in the cross beam; a pair of cap screws 47; and a rear channel 48 at the rear end of the brush box dimensioned to slidably receive clamp bar 46 therein. The rear channel includes a vertically extending slot 49 through which cap screws 47 may pass into the threaded apertures 51 in the clamp bar 46. The cap screws 47 may be tightened to a clamp position applying a compressive force to the clamp bar to secure the rear end of the associated brush box on the freestanding front terminus of the support casting 8. The cap screws 47 may be unscrewed slightly to an unclamped position releasing the clamp bar from compressive force to permit sliding adjustment or removal of the individual brush box without removal of any of the components of the releasable clamping mechanism 43.

The brush 3, which is slidably received within the brush box 38, is held in operative relation against the surface of the commutator 4 by means of a constant brush force applying means 54 which will now be described. The constant brush force applying means 54 comprises a brush lock and release clip 56. The clip is V-shaped when viewed in side elevation and includes front and rear legs 57 and 58. The front and rear legs are connected together at the lower ends thereof by a bite portion 59. The bite portion 59 includes quick release corner notches 61 engageable with trunnion pins 62 mounted in spaced relation to each other at the front end of the brush holder 31. A lock notch 63 is provided on front leg 57. A recoil constant force spring 64 has one end secured to the lower portion of rear leg 58 adjacent the bite portion 59. The spring is adapted to be unrolled toward the freestanding end of the rear leg 58. The freestanding ends of front and rear legs 57, 58 are provided with finger grip tabs 67, 68. The front end of the brush holder 31 is provided, adjacent an upper portion thereof, with a horizontal transverse lock pin 66 and at the lower portion thereof with a horizontal transverse guide pin 69. The lock pin 66 and the guide pin 69 are rigidly secured in spaced apart recessed portions 71, 72 of side walls 33, 34 at the front end 37 of the brush holder 31. A boss 73 is secured to the brush holder 31 adjacent the constant brush force applying means 54. A quick disconnect mount 76 is threadably secured in the boss 73 at a point laterally offset of the constant brush force applying means and is locked in position by means of a lock nut 77.

The assembly of the serviceable components will now be described and is best understood with reference to FIGS. 3 and 5-7. The brush 3 is slidably inserted in the brush box 38. The constant brush force applying means 54 is tilted slightly to enable the quick release notches 61 of the bite portion 59 to be slipped under the trunnion pins 62. The gripping tabs 66, 67 are then urged towards each other to compress the V-shaped constant brush force applying means 54 and it is then slid downwardly until the positive lock notch 63 engages the lock pin 66 with the lower end of the front leg 57 at rest against the guide pin 69. As the constant brush force applying means 54 is being inserted, the recoil spring 64 contacts the concave seat 78 in the top of the brush 3 and uncoils to the position shown in FIG. 5. Terminal 41 on shunt wire 39 is inserted in mount 76.

The individual brush holders 31 are detachably connected to the mounting surface 14 of the freestanding front terminus 12 of the support casting 8 by means of the cap screws 47. Each individual brush holder 31 is slid up or down to establish proper running clearance between it and the commutator 4. The cap screws 47 are then tightened causing the clamp bar 46 to compressively engage the rear channel 48 and lock it into position against the mounting surface 14.

Figure 6:
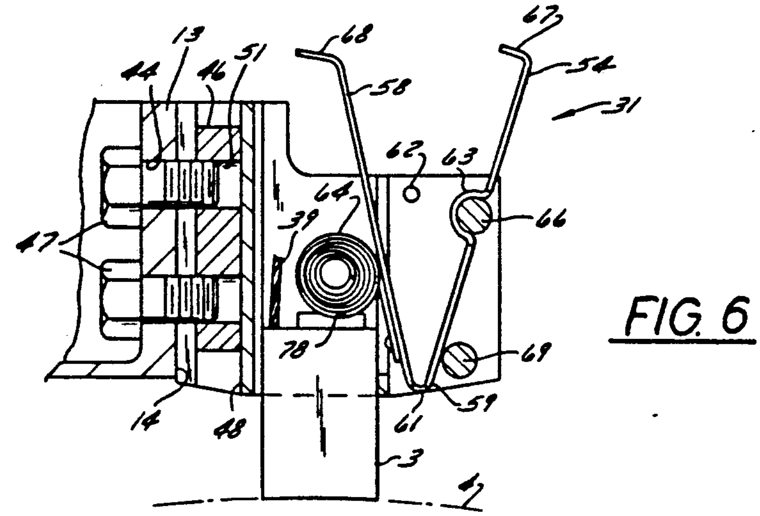
FIG. 6 is a partial view of the brush holder assembly shown in FIG. 1, in section, showing the brush in a worn condition, a portion of the brush shunt wire omitted.
Figure 7:
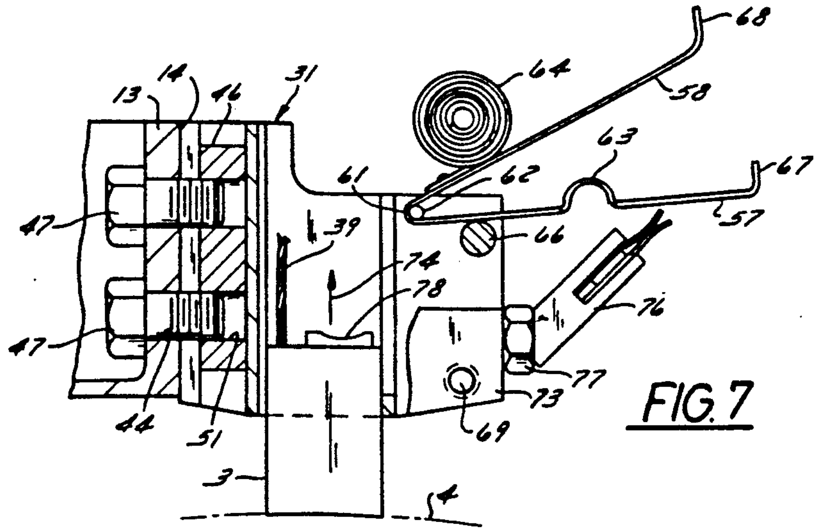
FIG. 7 is a partial view of the brush holder assembly shown in FIG. 1, in section, showing the constant brush force applying means in its removed position in relation to the quick disconnect mount for the brush shunt wire, a portion of which is omitted.

As wear occurs, the brush gradually shortens until the recoil constant force spring 64 has moved to the position shown in FIG. 6 at which point the brush must be replaced. In order to remove the brush 3 for replacement, the gripping tabs 66, 67 are pressed together to move the positive lock notch 63 out of engagement with the lock pin 69 to permit the constant brush force applying means 54 to be removed to the position shown in FIG. 7 wherein it is adjacent the quick disconnect mount 76. The terminal 41 on the wire shunt 39 is removed from the mount 76 permitting the worn brush to be removed in the direction of arrow 74. The new brush 3 is inserted and the above described procedure reversed to place the brush 3 back into its operative position. As shown, the quick disconnect mount 76 projects upward from boss 73 at a 45° angle. If space constraints so required, the mount could be designed to project from boss 73 upward at 90° instead of 45° to further condense the locus of the components.

From the foregoing description it will be appreciated that a brush holder assembly has been disclosed which provides for individual mounting of the brush boxes in a manner to permit quick replacement of any one individual brush box by simply loosening the cap screws 47 to allow the brush box to be slid off of the quick release clamp bar 46. In addition, the various components which require service have been ergonomically orientated in one central location in closely spaced relation to each other at the front of freestanding terminus 12 of the electrically conductive support 7 to maximize accessibility for quick and safe servicing purposes. The cap screws 47 are accessible at the terminus 12 of the support casting 8 and are closely adjacent the constant brush force applying tabs 66, 67 and the quick disconnect mount and terminal 76, 41.

Additional modifications and variations of the present invention will be apparent to those skilled in the art in light of the above teachings. Such modifications and adaptations are intended to be included within the scope of equivalence of the appended claims.

What is claimed is:

1. A brush holder assembly for releasable mounting on a frame of an electric machine, such as a motor or generator, so as to dispose a plurality of brushes in engagement with a rotatable commutator in said machine, said brush holder assembly comprising:

an electrically conductive support having a plurality of electric main terminals for connecting to a plurality of power lines and having means to releasably mount said support on said frame, said support including a freestanding front terminus having a mounting surface;

a plurality of individual constant force brush holders each having spaced apart sides, a rear end, a front end, a brush box between said front and rear ends of said brush holder for receiving a brush that includes a flexible wire lead extending therefrom which has a quick disconnect terminal, and a constant brush force applying means having a lock and release means located at said front end of said brush holder;

a detachable connecting means for detachably connecting each of said individual brush holders mechanically and electrically to said mounting surface of said support in side-by-side relation to each other so as to be accessible from said front terminus; and a plurality of quick disconnect mounts, each mount being mechanically and electrically connected to said front end of each brush holder adjacent said constant brush force lock and release means so that both said quick disconnect mount and said lock and release means are accessible at said front end of said brush holder.

2. The brush holder assembly according to claim 1 wherein said quick disconnect mount is secured to said front end of said brush holder and is laterally offset relative to said constant brush force lock and release means so that said lock and release means and quick disconnect mount are in adjacent closely spaced side-by-side relation to each other.

3. The brush holder according to claim 1 wherein detachable connecting means comprises a releasable clamp mechanism actuatable to ether a clamping position applying compressive force to secure said rear end of an associated individual brush box on said front terminus or to an unclamped position releasing said rear end from compressive force to permit removal of the individual brush box without removal of said releasable clamping mechanism.

4. The brush holder according to claim 3 wherein said releasable clamping mechanism includes a clamp bar secured in spaced relation to said front terminus mounting surface, and said rear end of said individual brush box includes a channel for slidably receiving said clamp bar therein.

5. The brush holder according to claim 1 wherein said electrically conductive support includes a base portion in which said electric main terminals are mounted; a plurality of spaced apart cantilever beams extending outboard from said base portion each terminating in an outboard end; and a cross beam connecting said outboard ends, and said cross beam having said mounting surface thereon.

6. The brush holder according to claim 5 wherein access apertures are provided in said support between said adjacent spaced apart cantilever beams.

* * * * *